Figure 3:
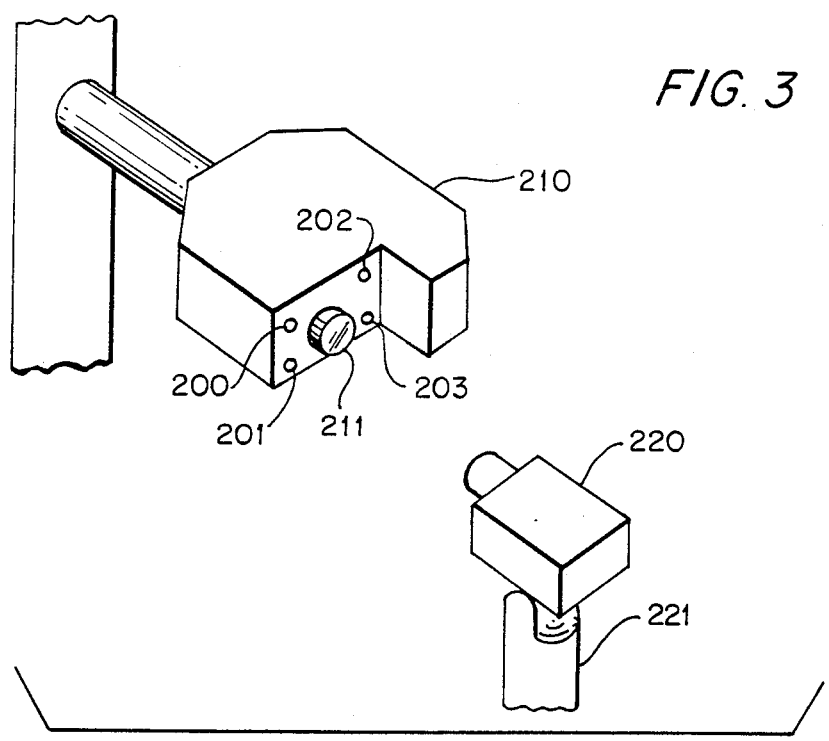

United States Patent [19]

Pryor

[11] Patent Number: 4,796,200
[45] Date of Patent: * Jan. 3, 1989

[54] TARGET BASED DETERMINATION OF ROBOT AND SENSOR ALIGNMENT

[75] Inventor: Timothy R. Pryor, Tecumseh, Canada

[73] Assignee: Diffracto Ltd., Windsor, Canada

[ * ] Notice: The portion of the term of this patent subsequent to Jun. 28, 2005 has been disclaimed.

[21] Appl. No.: 104,517

[22] Filed: Sep. 28, 1987

Related U.S. Application Data

[63] Continuation of Ser. No. 940,153, Dec. 9, 1986, abandoned, which is a continuation of Ser. No. 660,043, Oct. 12, 1984, abandoned.

[51] Int. Cl.[4] .......................... G06F 15/46; H04N 7/18
[52] U.S. Cl. ................................... 364/513; 358/107; 364/559; 364/478; 901/7; 901/47
[58] Field of Search ............... 364/513, 478, 479, 559, 364/191–193; 901/9, 46, 47, 7; 250/203 R; 358/104, 105, 107, 125, 126, 903; 414/730

[56] References Cited

U.S. PATENT DOCUMENTS

| | | | |
|---|---|---|---|
| 4,044,377 | 8/1977 | Bowerman | 358/107 |
| 4,146,924 | 3/1979 | Birk et al. | 364/559 X |
| 4,187,051 | 2/1980 | Kirsch et al. | 901/47 X |
| 4,219,847 | 8/1980 | Pinkney et al. | 364/559 X |
| 4,396,945 | 8/1983 | DiMatteo et al. | 358/107 |
| 4,453,085 | 6/1984 | Pryor | 901/47 X |
| 4,523,100 | 6/1985 | Payne | 250/561 |

Primary Examiner—Joseph Ruggiero
Attorney, Agent, or Firm—Larson and Taylor

[57] ABSTRACT

Target based machine vision method and apparatus are disclosed, useful for alignment of sensors and other objects affixed to structures, robots and the like.

While addressed particularly to alignment of machine vision systems relative to structures, the techniques disclosed are useful with a multitude of different sensors and objects.

10 Claims, 3 Drawing Sheets

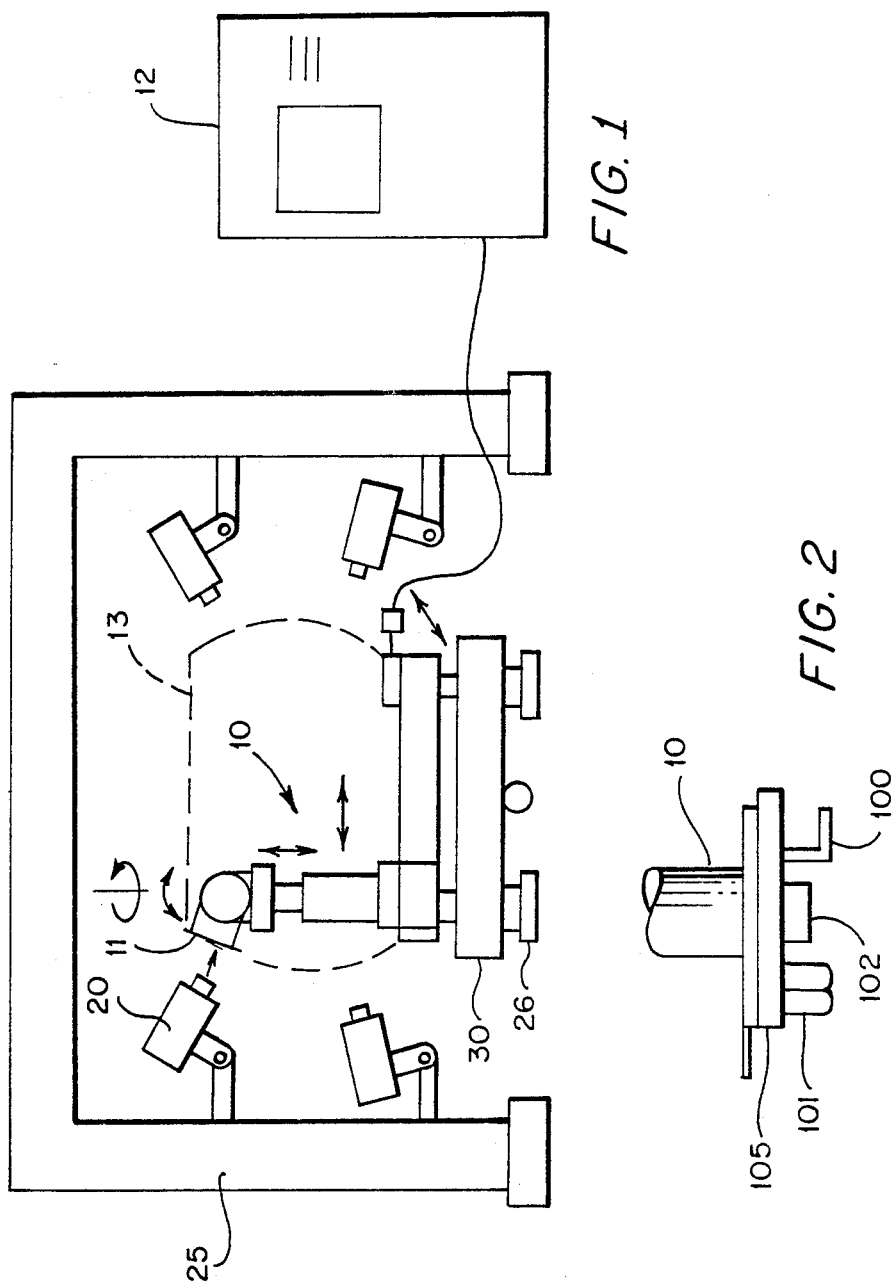

TARGET BASED DETERMINATION OF ROBOT AND SENSOR ALIGNMENT

This application is a continuation of application Ser. No. 940,153, filed Dec. 9, 1986, abandoned, which is a continuation of Ser. No. 660,043, filed Oct. 12, 1984, abandoned.

BACKGROUND

This invention is useful for setting up large fixtures, gages and robots as well as in construction of structures in general. It utilizes a highly accurate robot programmed from the CAD data base of a body for example to set up a master surface block or target in position for the sensors to see.

A method and apparatus is disclosed for setting up fixed and robotic systems by using a robot programmed by design data for a part or structure to simulate a master of same. Envisioned primarily for use in auto body fabrication processes, the invention is generally useable with smaller parts and assemblies. It is considered vitally useful for programmable assembly of bodies or other larger objects where a variety of styles or other considerations virtually preclude effective master parts. The invention sequentially creates, point by point, a master in space, using programmable placement of master surfaces, target points, or cameras capable of evaluating location of assembly robots and other items, generally from target points thereon.

Incorporated by reference are the following copending applications
1. "Target" Ser. No. 348,803, abandoned.
2. "Robot Calibration" Ser. No. 453,910, abandoned in power of FWC Ser. No. 750,049, abandoned.
   "Vision Assisted Fixture Construction" Ser. No. 660,279, abandoned.
4. "Pulsed Robotic Inspection" Ser. No. 462,127, abandoned in favor of Ser. No. 761,315, now U.S. Pat. No. 4,585,350.
5. "Robot Vision Using Target Holes, Corners and Other Object Features". Ser. No. 660,042, abandoned in favor of FWC 933,256, abandoned.

Conventional Techniques

Prior art solutions for mastering large structures such as car bodies or aircraft, have required construction of 'master'0 parts. Such masters are notoriously error prone, both in their manufacture and in their propensity to change with time, transport, etc. They are also very expensive (a typical car master cube or fixture can cost $1,000,000) and is large and extremely heavy, making frequent use in plant difficult.

How then does one say, realign or set up a single sensor on a robot or fixture relative to a part such as a body? Use of a master as described above is virtually precluded, and with current trends, master data actively lies in the CAD design program, not in a steel master anyway. This invention discloses several novel techniques, as well as other inventive concepts.

Figure 4:
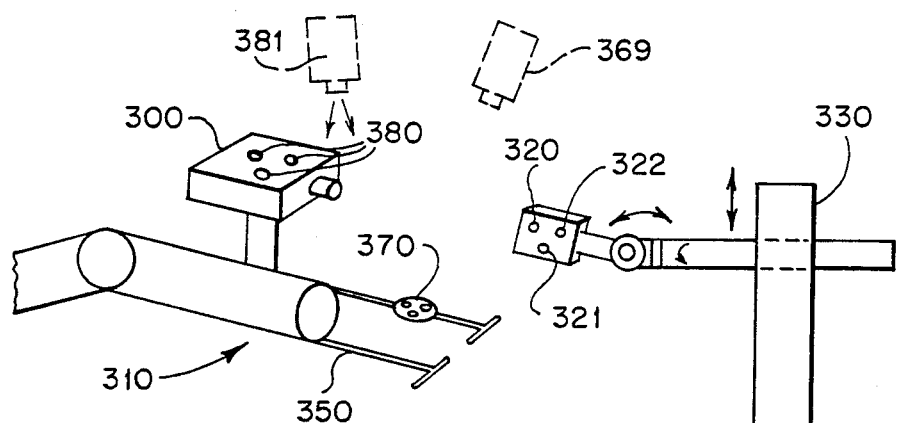
Figure 5A:
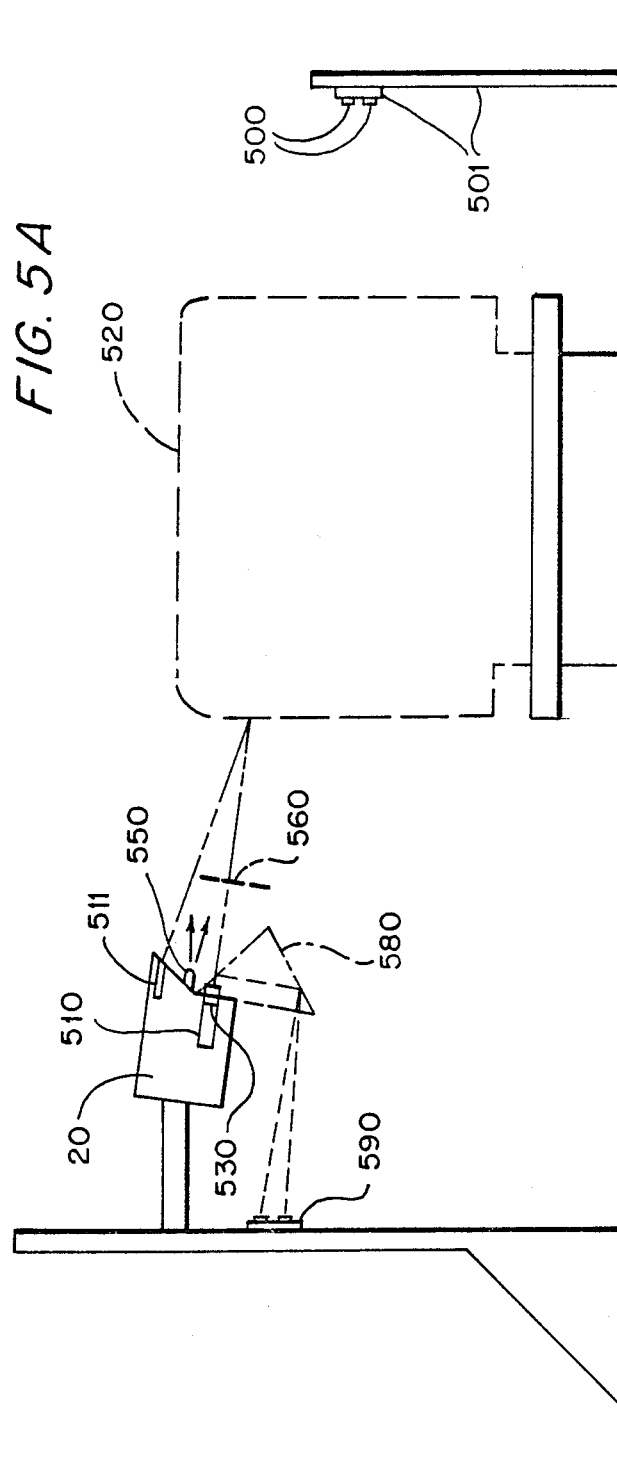
Figure 5B:
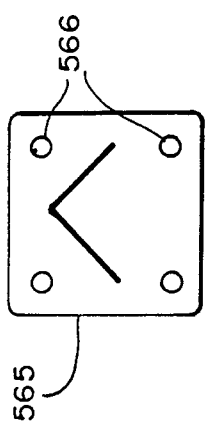

The invention is described in the following embodiments:
FIG. 1 illustrates a first embodiment of the invention
FIG. 2 illustrates a second embodiment of the invention
FIG. 3 illustrates a third embodiment of the invention
FIG. 4 illustrates a fourth embodiment of the invention
FIG. 5A illustrates a fifth embodiment of the invention
FIG. 5B illustrates an image of a matrix array.

FIG. 1 illustrates the invention where an accurate positioning multi degree of freedom robot such as 10 is used to accurately position surface 11 at a point in space under control of computer 12 which is programmed with CAD design data or other data of an object such as a car body 13 (dotted lines). The purpose of the robot 10 is to recreate, sequentially, the object itself in space such that machine vision based sensor units such as 20, attached to structure 25 can be lined up at key measurement locations.

This is an important embodiment since it is not possible in general to create an accurate master car body physically. In this case, however, a robot unit for example on one of the normal pallets 30 on which bodies are carried in a typical body plant 'Cartrac' conveyor 26, is brought in and programmed to move sequentially to the positions at which the body surfaces of a 'master car' or other desired situation would be. The sensor units on the structure then look at these positions in sequence and are then calibrated automatically relative to the math data base of the body used in the CAD system driving the robot. Clearly, movements can be programmed to exercise the sensors at the extremes of their range, within the body tolerance or any other routine.

This can be implemented interestingly in several ways. First it is desirable to use a robot that is quite accurate to make this sensor positioning. Preferable in many cases is a robot such as 10, capable of moving up from below, eg. with a telescopic tube. Since the car body essentially exists on the top and two sides, it is highly desirable to have a robot coming up from below in essentially an inverted gantry robot form. However, it is also possible to use a horizontal arm robot which can move side to side and then rotate around its base to position sensors on the other side essentially recreating the car body.

This highly accurate robot positioner could include several ways of correcting the sensors. The first way is to use, on the end of the robot end effector typically located on the end of a wrist on a horizontal arm, a NC machined block which would have effectively the same surface as that of the car at the location being checked. Typically such a block could be located on the end of the robot which would be interchangeable, either manually block by block, check by check, or via some sort of turret which would locate different blocks in sequence in position.

Alternatively, a single block might have NC machined into it numerous of the types of surfaces and the robot would simply position the correct portion of the block in the right example. This is shown in FIG. 2. Surfaces 100, 101, 102, characteristic of various body conditions, are indexable on slide 105 under computer control.

(Indeed, such a plate could mount any type of detail or tool not just a sensor, and thus the invention is of general use as described further on.)

The accurate robot is preferably of 6 or more axes capable of simulating location of all surfaces on a large 3D object (5 axes will suffice for some target sensing applications).

It should be noted as an aside that a robot of this type can be used for many more purposes than in setting up just inspection sensors. For example, anywhere in the line where it would be necessary to set up a CAD based equivalent of the car body, this unit can be used including setting up of all the welding robots and the like which could be off line programmed rather than "taught". This invention is a great assist in verifying off-line programs.

As an alternative to the sensor projecting light at a surface carried by the robot, a sensor camera mounted on the robot can look at target points on the sensor or on a mounting plate or other member to which the sensor is attached.

A second application is thus to utilize, as shown in FIG. 3, target points 200, 201, 202 and 203 on the sensor boxes such as light section type 210. In this case, a target sensing camera unit 220 to pin point the target location, is located on the end of the robot 221. This camera can be ideally positioned accurately in a known manner, and is potentially more accurate than theodolite units or other techniques. Automatic target sensing techniques are noted in copending application Ser. No. 348,803 and U.S. Pat. No. 4,219,847 (Pinckney et al).

Targets are typically retro reflective 'dots' of 3M Scotchlite 7615 ¼" in diameter or illuminated LEDs or fiber optic ends. Targets are typically in clusters of 3 or 4.

There is also a third possibility where the camera of the sensor (eg. 211) is on a check fixture (as in FIG. 1) or on camera units located on robots, such as 300 in FIG. 4, for the purpose of guiding robot welders such as 310. For example, one can use target points such as 320, 321, 322 located on the end of the accurate calibrated robot 330 (in this case a horizontal arm type capable of rotating round its base) to calibrate sensors. Where sensors are susceptible to variations in the surface and the like and need to be more closely calibrated to certain surfaces as in sometimes the check fixture sensors, the same idea as FIG. 1 can be utilized using master blocks on the end of the high accuracy robot (in this case containing test panels which could be welded by spot welder tip 350). Similarly, adhesive robot spray trim assembly robots, machining robots and all other types can be checked out in this manner.

It is noted that with a single target point and a single matrix array camera (such as GE TN2500), an xy location can be determined (with linear arrays such as Reticon 1024G only a single axis of data is available). If 3, or better 4, targets are used with said matrix camera, a full 6 degree of freedom solution is available (x,y,z, roll, pitch, yaw). This can be obtained with a single camera, or to even better accuracies, with two cameras (which is needed where the polar/rotational theodolite layout is used for the accurate robot).

Thus, location of sensor to target and alignment can be determined by moving the target (or sensor) to different known points and reading the effect.

The same holds true for a body test surface which is moved by the robot in front of a ranging or gray level image detecting sensor.

Again noted is the very important feature that the accurate robot preferably is driven from the CAD system descriptive of the part to which it is setting up. It doesn't have to be car bodies, it could be any generalized part to which the robot is capable of describing the positions of or even a portion of its positions. In other words, it's possible to entertain more than one robot to set up the positions for any given structure.

Car bodies are the principal application envisioned at this point in time, and potentially aircraft as well. The key requirement for this device and that shown above is in the area of continued verification of sensor or tooling positions and particularly those that are programmably placed and therefore subject to drift or other difficulties. It is also particularly those programmable ones that can be off line programmed where means is required to check the program validity relative to an actual part which may exist only in a data base.

The accurate robot need not be on a pallet but can be brought to the check out location by any means (crane, AGV, truck, etc.). When pallet mounted with say 60 other auto body pallets in a loop, it could circulate once per loop revolution checking each station in turn, or only those stations in trouble (eg. the robotic weld station of FIG. 4). Alternatively it could be cycled after hours. Accurate machine location is typically under full automatic control, but manually can be positioned too.

Another embodiment is to employ an overhead sensor such as 369 (dotted lines) for targets on a welder end tooling and sense the location of the targets using a camera overhead or elsewhere located to dynamically correct the welder location during the welding process, and/or to record the metal surface position by recording the point at which the surface contacts the welder tip (eg. completing a circuit) while monitoring the targets location at this instant. In this manner one can determine car surface location in line without resort to special in-line check fixtures as in FIG. 1.

Similarly, camera 300 of vision controlled robot welder can be used to view the location of other features of the car surface and its location can be accurately determined by camera 381 looking at targets 380. Accuracies can be to 0.001", easily in excess of the 0.50" of typical hydraulic robots used in automotive welding.

Thus, by judicious use of camera technology, robot or other working stations can be used to inspect the part before, during or after working to determine desired corrective action required, if any (such as off sorting robot programs, adjusting previous operations, producing out of tolerance parts, entering the station).

It is noted that for target sighting, the multi degree of freedom accurate robot can be a angular coordinate theodolite type system capable of pointing a checkout camera at the sensor (as in FIG. 3), or presenting targets to a sensor camera (as in FIG. 4). This single or dual theodolite arrangement is much simpler mechanically and can be more easily brought to the station or carried down line on the pallet. However, it obviously can't position a surface in the correct car position. It further requires a larger depth of field of the camera unit (which isn't too severe). See FIG. 5A whose approach can be used if necessary.

In FIG. 5A, another aspect of the invention is noted. Targets 500 or plate 501 for example can be placed across the line from the light section camera sensor 20 comprised of solid state TV camera 510 and 10 MW laser diode line projection source 511. Once the sensor 20 is aligned with respect to car body 520, targets 500 can be placed to allow camera pointing direction to be determined at any time, such as on sensor replacement. It can also be used for automatically offsetting measured part data in the computer, if the angle of sensor view is determined to be shifted on consideration of the targets.

Every time the car body is transfered, the view is open for sensor 20 to view the targets and thus a correction 'shot' can be taken each cycle to assure the sensor is in the correct position. To accomplish this effectively the typical sensor (imaging or light section) has to have a large depth of field or an ability to adjust field depth such as with adjustable iris diaphragm 530. This is useful as laser power 511 is limited and the light section triangulation sensor which tyically has to run with a wide open lens due to light power considerations on reflectance from body 520. With retro reflective targets such as 500, a small light 550 (which could also be a laser) is sufficient to obtain good data with the lens stopped down.

Targets can also be located on a transparent screen 560 in the field of view but out of the area of interest (FIG. 5B inset shows images 566 of targets on camera matrix 565). Also possible is to use a beam splitter, prism combination 580 (dotted lines) (or indexible mirror) to direct an image of targets 590 to the sensor camera.

While generally used for non-contact sensor units of the triangulation type, the procedures herein are useful for other sensors or devices such as capacitive sensors, etc.

Note that where the accurate robot is indexed into a station (such as on the Cartrac pallet of FIG. 1), it is necessary to locate the pallet accurately relative to the structure holding the object of interest such as the sensors shown. This can be done using physical locators such as shot pins, clamps etc., or can be done by using the robot to point a TV camera or other means at a plurality of reference points (targets) on said structure from which the relative location of structure to robot can be determined.

In general however, unless parts to be made can also be target located from said structure, it is best to locate the accurate robot in the same manner as the part (eg. a car on a pallet).

I claim:

1. A method for locating an object mounted on a structure comprising the steps of:
    providing a plurality of optically visible targets on the object at known locations;
    mounting a TV camera for movement on a highly accurately positionable robot having a plurality of axes of motion;
    locating the positionable robot at a location known relative to the structure so that the position of the TV camera relative to the structure is known;
    moving the positionable robot to position the TV camera at a predetermined point in space known relative to the structure;
    viewing the targets with the TV camera;
    determining the location of the targets with the TV camera relative to the TV camera, and hence relative to the structure; and
    determining from the targets location relative to the structure the location of the object relative to the structure.

2. A method for locating an object as claimed in claim 1 wherein the positionable robot includes a computer control; and wherein the moving step includes the step of controlling the movement of the positionable robot with the computer control.

3. A method for locating an object as claimed in claim 2 wherein the controlling step includes the step of inputting data from a data base into the computer which data base represents a part to which the object will be operatively associated such that the positionable robot is moved accordingly.

4. A method for locating an object as claimed in claim 1 wherein the object is mounted to the structure by a programmable movable robot and further including the steps of determining a desired location of the object, comparing the desired location to the determined location of the object, and moving the movable robot to move the object to the desired location.

5. A method for locating an object as claimed in claim 4 wherein the moving the positionable robot step includes the step of programming the positionable robot to move accordingly.

6. A method for locating an object as claimed in claim 1 wherein the positionable robot is located on a conveying means for conveying the positionable robot; and further including the step of transferring the positionable robot to the known position relative to the structure with the conveying means.

7. A method for locating an object as claimed in claim 6 wherein there are a plurality of different structures having a plurality of respective objects; and further including the steps of conveying the positionable robot to each of the structures sequentially where the location of the respective object is then determined.

8. A method for locating a test object comprising the steps of:
    providing a position sensing means on a movable robot for sensing the position of the test object;
    sensing the position of the test object relative to the sensing means with the sensing means;
    providing targets on one of the sensing means and robot;
    determining the position of the sensing means from the sensed position of the targeted one of the sensing means and robot; and
    determining the location of the test object from the determined position of the sensing means and the determined position of the test object relative to the sensing means.

9. A method for locating a test object as claimed in claim 8 wherein said sensing means is a TV camera; and wherein said sensing step includes the steps of providing targets on the test object and imaging the targets with the TV camera.

10. A method for locating a test object as claimed in claim 8 and further including the steps of determining variations in a desired position of the test object and the determined position of the test object, and correcting the position of the test object from the determined position to the desired position.

* * * * *